United States Patent
Hua et al.

(10) Patent No.: US 11,310,774 B2
(45) Date of Patent: Apr. 19, 2022

(54) DATA PROCESSING METHOD AND TERMINAL DEVICE

(71) Applicant: HUAWEI TECHNOLOGIES CO., LTD., Shenzhen (CN)

(72) Inventors: Meng Hua, Shanghai (CN); Shurong Jiao, Shanghai (CN); Yujia Sun, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 174 days.

(21) Appl. No.: 16/875,320

(22) Filed: May 15, 2020

(65) Prior Publication Data

US 2020/0288440 A1 Sep. 10, 2020

Related U.S. Application Data

(63) Continuation of application No. PCT/CN2018/115475, filed on Nov. 14, 2018.

(30) Foreign Application Priority Data

Nov. 17, 2017 (CN) .......................... 201711148118.9

(51) Int. Cl.
*H04W 4/00* (2018.01)
*H04W 72/04* (2009.01)
*H04W 72/12* (2009.01)

(52) U.S. Cl.
CPC ........... *H04W 72/04* (2013.01); *H04W 72/12* (2013.01)

(58) Field of Classification Search
CPC ................... H04W 72/12; H04W 72/04; H04J 2203/0069
See application file for complete search history.

(56) References Cited

U.S. PATENT DOCUMENTS

2010/0290419 A1* 11/2010 Wengerter ............ H04L 5/0037
370/329
2011/0274068 A1* 11/2011 Lee ....................... H04L 1/0017
370/329

(Continued)

FOREIGN PATENT DOCUMENTS

CN 107241288 A 10/2017

OTHER PUBLICATIONS

Huawei et al., "On pre-emption indication for DL multiplexing of URLLC and eMBB,", 3GPP TSG RAN WG1 Ad Hoc Meeting R1-1715409, Nagoya, Japan, Sep. 18-21, 2017. total 15 pages.

(Continued)

*Primary Examiner* — Shantell L Heiber
(74) *Attorney, Agent, or Firm* — Hauptman Ham, LLP

(57) ABSTRACT

A data processing method executed by a terminal device includes: receiving first indication information sent by a network device; receiving second indication information sent by the network device, where the second indication information is used to indicate that soft values of first data received are to be processed in a first processing manner or a second processing manner, the first data is carried on a second resource, and both the first resource and the second resource include a third resource; determining a target processing manner from the first processing manner and the second processing manner based on the first indication information and/or the second indication information; and processing soft values of data in the third resource in the target processing manner.

20 Claims, 8 Drawing Sheets

(56) References Cited

U.S. PATENT DOCUMENTS

2014/0050130 A1\* 2/2014 Kim ................. H04L 5/1469
370/280
2016/0227479 A1\* 8/2016 Ma ................. H04W 48/16

OTHER PUBLICATIONS

Sequans et al., "DCI for CBG based retransmission,", 3GPP TSG RAN WG1 Meeting AH_NR#3 R1-1716067, Nagoya, Japan, Sep. 18-21, 2017. total 5 pages.
Samsung et al, "Offline discussions on CBG-based retransmission for AI 6.1.3.3.4,", 3GPP TSG RAN WG1 Meeting #90 R1-1715223, Prague, Czechia, Aug. 21-25, 2017. total 8 pages.
China Telecom et al., "Remaining issues on CBG-based (re)transmission, ", 3GPP TSG RAN WG1 Meeting #90bis R1-1718672, Prague, Czechia, Aug. 21-25, 2017. total 3 pages.
Vivo et al., "Support of CBG-based (re)transmission,", 3GPP TSG RAN WG1 Meeting 90bis R1-1717499, Prague, CZ, Oct. 9-13, 2017. total 5 pages.
International search report dated Feb. 2, 2019 from corresponding application No. PCT/CN2018/115475.

\* cited by examiner

DATA PROCESSING METHOD AND TERMINAL DEVICE

CROSS-REFERENCE TO RELATED APPLICATIONS

This application is a continuation of International Application No. PCT/CN2018/115475, filed on Nov. 14, 2018, which claims priority to Chinese Patent Application No. 201711148118.9, filed on Nov. 17, 2017. The disclosures of the aforementioned applications are hereby incorporated by reference in their entireties.

TECHNICAL FIELD

This application relates to the field of communications technologies, and more specifically, to a data processing method and a terminal device.

BACKGROUND

In a communications system, a network device may indicate, by using one type of indication information, whether scheduling data of a terminal device is transmitted on a first resource, and indicate, by using another type of indication information, that soft values of to-be-processed data received by the terminal device are to be processed. The terminal device may separately perform subsequent data processing based on the two types of indication information. However, when there is an intersection set between a resource carrying the to-be-processed data and the first resource, how to process soft values of data in a resource jointly included in the resource carrying the to-be-processed data and the first resource is a problem that needs to be resolved.

SUMMARY

This application provides a data processing method and a terminal device, to determine a processing manner of soft values of data on some resources in an intersection set of resources more appropriately.

According to a first aspect, a data processing method is provided. The method includes: receiving, by a terminal device, first indication information sent by a network device, where the first indication information is used to indicate whether data corresponding to first scheduling of the terminal device is transmitted on a first resource, and there is an intersection set between the first resource and a resource corresponding to the first scheduling; receiving, by the terminal device, second indication information sent by the network device, where the second indication information is used to indicate that soft values of first data received by the terminal device are to be processed in a first processing manner or a second processing manner, the first processing manner and the second processing manner are different processing manners, the first data is carried on a second resource, and both the first resource and the second resource include a third resource; determining, by the terminal device, a target processing manner from the first processing manner and the second processing manner based on the first indication information and/or the second indication information; and processing, by the terminal device, soft values of data in the third resource in the target processing manner.

The first indication information may be discontinuous transmission indication information. The second indication information may be code block group flushing out information (CBGFI).

In this application, a processing manner of soft values of data on some resources in an intersection set of the first resource and the second resource can be determined by comprehensively considering the first indication information and the second indication information or considering only one of the first indication information and the second indication information.

With reference to the first aspect, in some implementations of the first aspect, the determining, by the terminal device, a target processing manner from the first processing manner and the second processing manner based on the first indication information and/or the second indication information includes:

when the second indication information indicates that the soft values of the first data are to be processed in the second processing manner, determining, by the terminal device, the second processing manner as the target processing manner.

When the second indication information indicates that the soft values of the first data are to be processed in the second processing manner, the second processing manner is directly determined as the target processing manner based on the second indication information. This can reduce data processing complexity and improve data processing efficiency.

With reference to the first aspect, in some implementations of the first aspect, the determining, by the terminal device, a target processing manner from the first processing manner and the second processing manner based on the first indication information and/or the second indication information includes:

when the second indication information indicates that the soft values of the first data are to be processed in the first processing manner, and the first indication information indicates that the data corresponding to the first scheduling is transmitted on the first resource, determining, by the terminal device, the second processing manner as the target processing manner.

The target processing manner can be more appropriately determined by comprehensively considering the first indication information and the second indication information.

With reference to the first aspect, in some implementations of the first aspect, the determining, by the terminal device, a target processing manner from the first processing manner and the second processing manner based on the first indication information and/or the second indication information includes:

when the second indication information indicates that the soft values of the first data are to be processed in the first processing manner, the first indication information indicates that the data corresponding to the first scheduling of the terminal device is transmitted on the first resource, and the first resource is a subset of the second resource, determine, by the terminal device, the second processing manner as the target processing manner.

With reference to the first aspect, in some implementations of the first aspect, the determining, by the terminal device, a target processing manner from the first processing manner and the second processing manner based on the first indication information and/or the second indication information includes: when the second indication information indicates that the soft values of the first data are to be processed in the first processing manner, the first indication information indicates that the data corresponding to the first scheduling of the terminal device is transmitted on the first resource, and the first resource is not a subset of the second resource, determining, by the terminal device, the first processing manner as the target processing manner.

When the target processing manner is determined, in addition to the first indication information and the second indication information, whether the first resource is a subset of the second resource is further considered, to determine the target processing manner. Therefore, when the target processing manner is determined, an inclusion status of the first resource and the second resource can be considered, to determine the target processing manner more appropriately.

With reference to the first aspect, in some implementations of the first aspect, the determining, by the terminal device, a target processing manner from the first processing manner and the second processing manner based on the first indication information and/or the second indication information includes:

when the second indication information indicates that the soft values of the first data are to be processed in the first processing manner, the first indication information indicates that the data corresponding to the first scheduling of the terminal device is transmitted on the first resource, and the first resource is not a subset of the second resource, determining, by the terminal device, a ratio of a size of the third resource to a size of the first resource; and when the ratio of the size of the third resource to the size of the first resource exceeds a preset threshold, determining, by the terminal device, the second processing manner as the target processing manner; or when the ratio of the size of the third resource to the size of the first resource is less than or equal to the preset threshold, determining, by the terminal device, the first processing manner as the target processing manner.

With reference to a proportion of the third resource in the first resource, the target processing manner can be more appropriately determined based on importance of the third resource in the first resource (when the proportion of the third resource in the first resource is larger, it may be considered that the importance of the third resource is higher).

With reference to the first aspect, in some implementations of the first aspect, the determining, by the terminal device, a target processing manner from the first processing manner and the second processing manner based on the first indication information and/or the second indication information includes:

when the second indication information indicates that the soft values of the first data are to be processed in the first processing manner, and the second resource is a subset of the first resource, determining, by the terminal device, the first processing manner as the target processing manner; or when the second indication information indicates that the soft values of the first data are to be processed in the second processing manner, and the second resource is a subset of the first resource, determining, by the terminal device, the second processing manner as the target processing manner.

When the second resource is the subset of the first resource, an indication granularity of the second indication information is smaller (a resource corresponding to the second indication information is smaller), and the target processing manner may be determined more accurately based on an indication of the second indication information.

With reference to the first aspect, in some implementations of the first aspect, the determining, by the terminal device, a target processing manner from the first processing manner and the second processing manner based on the first indication information and/or the second indication information includes:

when the first indication information indicates that the data corresponding to the first scheduling of the terminal device is transmitted on the first resource, and the first resource is a subset of the second resource, determining, by the terminal device, the second processing manner as the target processing manner; or when the first indication information indicates that no data corresponding to the first scheduling of the terminal device is transmitted on the first resource, and the first resource is a subset of the second resource, determining, by the terminal device, the first processing manner as the target processing manner.

When the first resource is a subset of the second resource, because an indication granularity of the first indication information is smaller (a resource corresponding to the first indication information is smaller), the target processing manner may be determined more accurately based on an indication of the first indication information.

With reference to the first aspect, in some implementations of the first aspect, the determining, by the terminal device, a target processing manner from the first processing manner and the second processing manner based on the first indication information and/or the second indication information includes:

determining, by the terminal device in a first case or a second case, a modulation scheme of the data carried on the third resource; and when the third resource carries the data whose modulation scheme is different from a modulation scheme indicated by the first scheduling, determining the first processing manner as the target processing manner; where the first case includes: the first indication information indicates that the data corresponding to the first scheduling is transmitted on the first resource, and the second indication information indicates that the soft values of the first data are to be processed in the first processing manner; and the second case includes: the first indication information indicates that no data corresponding to the first scheduling is transmitted on the first resource, and the second indication information indicates that the soft values of the first data are to be processed in the second processing manner.

When the indication of the first indication information is inconsistent with the indication of the second indication information, a processing manner used as the target processing manner can also be comparatively accurately determined by determining the modulation scheme.

With reference to the first aspect, in some implementations of the first aspect, when the first indication information indicates that the data corresponding to the first scheduling of the terminal is transmitted on the first resource, the first indication information indicates that the entire first resource is used to transmit data that is corresponding to L times of scheduling of L devices and that is on the first resource, where the L devices are in a one-to-one correspondence with the L times of scheduling, the L devices include the terminal device, the L times of scheduling include the first scheduling, and L is an integer greater than 0.

With reference to the first aspect, in some implementations of the first aspect, when the first indication information indicates that no data corresponding to the first scheduling of the terminal device is transmitted on the first resource, the first indication information indicates a part or none of the first resource is used to transmit data that is corresponding to L times of scheduling of L devices and that is on the first resource, where the L devices are in a one-to-one correspondence with the L times of scheduling, the L devices include the terminal device, the L times of scheduling include the first scheduling, and L is an integer greater than 0.

With reference to the first aspect, in some implementations of the first aspect, the first indication information includes N bits, and a value of an $i^{th}$ bit in the N bits is used to indicate whether the data corresponding to the first scheduling of the terminal device is transmitted on the first resource, where N is an integer greater than 0, i is an integer greater than or equal to 0, and $0 \leq i < N$.

A value range of i may alternatively be $1 \leq i \leq N$. When a value of the $i^{th}$ bit is 0, it may indicate that no data corresponding to the first scheduling of the terminal device is transmitted on the first resource; or when a value of the $i^{th}$ bit is 1, it may indicate that the data corresponding to the first scheduling of the terminal device is transmitted on the first resource. Certainly, alternatively, when a value of the $i^{th}$ bit is 0, it may indicate that the data corresponding to the first scheduling is transmitted on the first resource; or when a value of the $i^{th}$ bit is 1, it may indicate that no data corresponding to the first scheduling is transmitted on the first resource.

It should be understood that the $i^{th}$ bit may be any one of the N bits. In other words, a value of any one of a plurality of bits in the first indication information may be used to indicate whether the data corresponding to the first scheduling of the terminal device is transmitted on the first resource.

With reference to the first aspect, in some implementations of the first aspect, when the second indication information indicates that the soft values of the first data are to be processed in the first processing manner, the second indication information indicates that all or some of the soft values of the first data are to be processed in the first processing manner.

With reference to the first aspect, in some implementations of the first aspect, the first processing manner and the second processing manner indicate erasing soft values of data, where an erasing strength the soft values of the data in the first processing manner is greater than an erasing strength the soft values of the data in the second processing manner.

With reference to the first aspect, in some implementations of the first aspect, the first processing manner and the second processing manner indicate erasing soft values of data, where an erasing coefficient of the first processing manner is greater than an erasing coefficient of the second processing manner.

Values of the erasing coefficients of the first processing manner and the second processing manner are 0 or 1. A larger erasing coefficient indicates a larger strength of erasing of soft values of data. When the erasing coefficient is 0, it indicates no erasing, and when the erasing coefficient is 1, it indicates complete erasing.

In addition, the values of the erasing coefficients of the first processing manner and the second processing manner may be as follows: A maximum value of the erasing coefficient of the first processing manner can be set to 1, and a minimum value of the erasing coefficient of the first processing manner cannot be set to 0. A maximum value of the erasing coefficient of the second processing manner cannot be set to 1, and a minimum value of the erasing coefficient of the second processing manner can be set to 0.

With reference to the first aspect, in some implementations of the first aspect, the first processing manner and the second processing manner indicate retaining soft values of data, where a strength of retaining the soft values of the data in the first processing manner is less than a strength of retaining the soft values of the data in the second processing manner.

With reference to the first aspect, in some implementations of the first aspect, the first processing manner and the second processing manner indicate retaining soft values of data, and a retention coefficient of the first processing manner is less than a retention coefficient of the second processing manner.

A value of the retention coefficient is 0 or 1. A larger retention coefficient indicates a larger strength of retaining the soft values of the data. When the retention coefficient is 0, it indicates that none of the soft values of the data is retained (which is equivalent to that all of the soft values of the data are erased). When the retention coefficient is 1, it indicates that all the soft values of the data are retained (which is equivalent to that the soft values of the data are not erased at all).

In addition, the values of the retention coefficients of the first processing manner and the second processing manner may be as follows: A minimum value of the retention coefficient of the first processing manner can be set to 0, and a maximum value of the retention coefficient of the first processing manner cannot be set to 1. A maximum value of the retention coefficient of the second processing manner can be set to 1, and a minimum value of the retention coefficient of the second processing manner cannot be set to 0.

According to a second aspect, a terminal device is provided. The terminal device includes modules configured to execute the method according to any one of the first aspect or the implementations of the first aspect.

According to a third aspect, a terminal device is provided. The terminal device includes: a memory, configured to store a program; and a processor, configured to execute the program stored in the memory. When the program is executed, the processor is configured to execute the method according to any one of the first aspect or the implementations of the first aspect.

According to a fourth aspect, a computer readable medium is provided. The computer readable medium stores program code to be executed by a device, and the program code includes an instruction used to execute the method according to any one of the first aspect or the implementations of the first aspect.

According to a fifth aspect, computer program code is provided. The program code includes an instruction used to execute the method according to any one of the first aspect or the implementations of the first aspect.

According to a sixth aspect, a processor is provided. The processor is configured to execute the method according to any one of the first aspect or the implementations of the first aspect. Optionally, the processor executes the method by running a software program. Optionally, the software program may be stored in a memory.

According to a seventh aspect, an apparatus is provided. The apparatus includes the processor in the sixth aspect and a transceiver. When performing an operation related to signal sending and receiving, the processor implements the sending and receiving by invoking or driving the transceiver. The transceiver, driven by the processor, is configured to perform signal sending and receiving actions.

DESCRIPTION OF EMBODIMENTS

The following describes technical solutions of this application with reference to accompanying drawings.

The technical solutions in the embodiments of this application may be applied to a plurality of communications systems, for example, a future 5th generation (5G) system, a new radio (NR) system, or a communications system that has a same architecture as a 5G system.

A terminal device in the embodiments of this application may also be referred to as user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with a terminal device. The network device may be a radio controller in a cloud radio access network (CRAN) scenario, or the network device may be a relay station, an access point, a vehicle-mounted device, a wearable device, a network device in a future 5G network, a network device in a future evolved PLMN network, or the like. This is not limited in this embodiment of this application.

Figure 1:
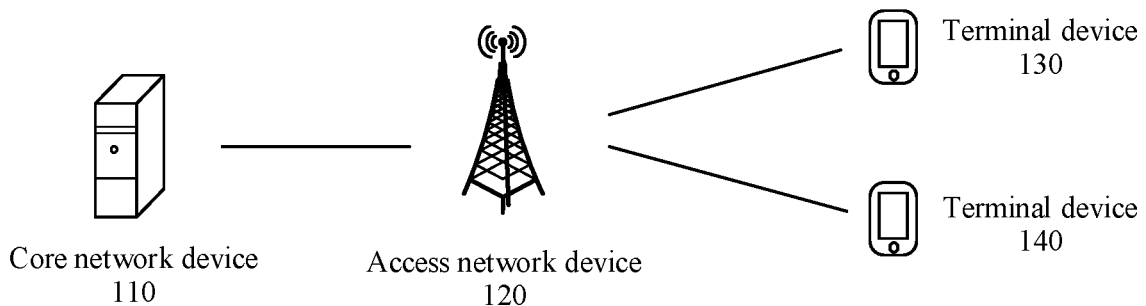
FIG. 1 is a schematic architectural diagram of a mobile communications system to which an embodiment of this application is applied.

FIG. 1 is a schematic architectural diagram of a mobile communications system to which an embodiment of this application is applied.

The mobile communications system shown in FIG. 1 includes a core network device 110, an access network device 120, and at least one terminal device 130 (two terminal devices are shown in FIG. 1). The terminal device 130 may be connected to the access network device 120 in a wireless manner, and the access network device 120 may be connected to the core network device 110 in a wireless or wired manner. The core network device 110 and the access network device 120 may be independent and different physical devices, functions of the core network device 110 and logical functions of the access network device 120 may be integrated into a same physical device, or some functions of the core network device 110 and some functions of the access network device 120 may be integrated into a physical device. The terminal device may be at a fixed location, or may be movable. It should be understood that FIG. 1 is only a schematic diagram of a mobile communications system. The mobile communications system may further include another network device, for example, may further include a wireless relay device and a wireless backhaul device, which are not drawn in FIG. 1. Quantities of core network devices, access network devices, and terminal devices included in the mobile communications system are not limited in this embodiment of this application.

The access network device in FIG. 1 is an access device used by the terminal device to connect to the mobile communications system in a wireless manner, and may be a base station NodeB, an evolved base station eNodeB, a base station in a 5G mobile communications system, a base station in a future mobile communications system, an access node in a WiFi system, or the like. A technology and a device form that are used by the access network device are not limited in this embodiment of this application.

It should be understood that FIG. 1 is merely a schematic diagram of a mobile communications system to which this embodiment of this application may be applied. This embodiment of this application may be further applied to another mobile communications system that can implement communication between a network device and a terminal device. A form of the mobile communications system to which this embodiments of this application can be applied is not limited in this embodiment of this application.

The following describes in detail a data processing method in the embodiments of this application with reference to FIG. 2 to FIG. 8.

Figure 2:
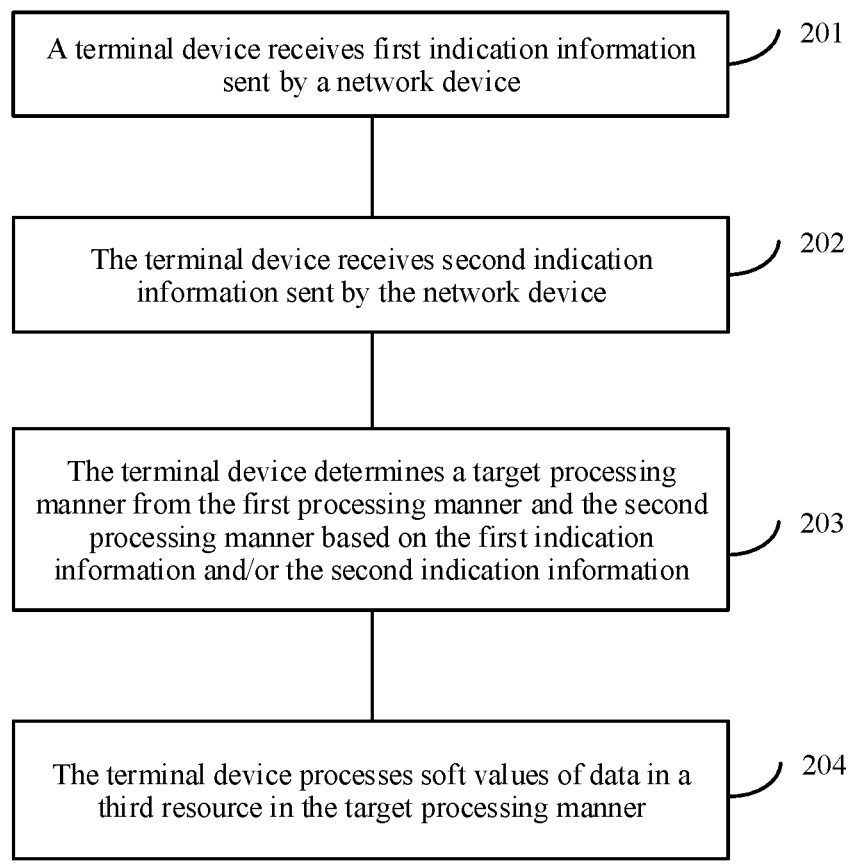
FIG. 2 is a schematic flowchart of a data processing method according to an embodiment of this application.

FIG. 2 is a schematic flowchart of a data processing method according to an embodiment of this application. The method shown in FIG. 2 may be performed by a terminal device. In addition, a network device in the method shown in FIG. 2 may be the access network device in FIG. 1.

The method shown in FIG. 2 includes step 201 to step 204, and step 201 to step 204 are described in detail below.

201. The terminal device receives first indication information sent by the network device.

The first indication information may be used to indicate whether data corresponding to first scheduling of the terminal device is transmitted on a first resource. The first scheduling may be a scheduling command or a scheduling indication used by the network device to schedule the terminal device to transmit a service. For example, the first scheduling may be a scheduling command used by the network device to schedule the terminal device to receive data of an enhanced mobile broadband (eMBB) service.

The first resource may be some of all available resources between the terminal device and the network device, the first resource may be a resource allocated by the network device to a plurality of terminal devices, and the first resource may be used to transmit data that is corresponding to a plurality of times of scheduling of the plurality of devices and that is on the first resource.

Optionally, when the first indication information indicates that the data corresponding to the first scheduling is transmitted on the first resource, the first indication information may indicate that the entire first resource is used to transmit the data that is corresponding to L times of scheduling of L devices and that is on the first resource. In this case, after the terminal device receives the first indication information, the terminal device may consider that the entire first resource is used to transmit the data that is corresponding to the L times of scheduling of the L devices and that is on the first resource.

Optionally, when the first indication information indicates that no data corresponding to the first scheduling of the terminal device is transmitted on the first resource, the first indication information may indicate a part or none of the first resource is used to transmit, on the first resource, the data that is corresponding to the L times of scheduling of the L devices and that is on the first resource. In this case, after the terminal device receives the first indication information, the terminal device may consider that a part or none of the first resource is used to transmit the data that is corresponding to the L times of scheduling of the L devices and that is on the first resource.

It should be understood that L may be an integer greater than 0, the L devices are in a one-to-one correspondence with the L times of scheduling, the L devices include the terminal device, and the L times of scheduling include the first scheduling.

The first indication information may be discontinuous transmission indication information.

Optionally, in an embodiment, the first indication information includes N bits, and a value of an $i^{th}$ bit in the N bits is used to indicate whether the data corresponding to the first scheduling of the terminal device is transmitted on the first resource, where N is an integer greater than 0, i is an integer greater than or equal to 0, and $0 \leq i < N$.

A value range of i may alternatively be $1 \leq i \leq N$. When a value of the $i^{th}$ bit is 0, it may indicate that no data corresponding to the first scheduling of the terminal device is transmitted on the first resource; or when a value of the $i^{th}$ bit is 1, it may indicate that no data corresponding to the first scheduling of the terminal device is transmitted on the first resource. Certainly, alternatively, when a value of the $i^{th}$ bit is 0, it indicates that the data corresponding to the first scheduling is transmitted on the first resource; or when a value of the $i^{th}$ bit is 1, it indicates that no data corresponding to the first scheduling is transmitted on the first resource.

It should be understood that the $i^{th}$ bit may be any one of the N bits. In other words, a value of any one of a plurality of bits in the first indication information may be used to indicate whether the data corresponding to the first scheduling of the terminal device is transmitted on the first resource.

It should be understood that a bit in the first indication information may be used to indicate whether data of scheduling of a device is transmitted on a resource. Therefore, the N bits in the first indication information may indicate whether data corresponding to scheduling of a device is transmitted on each of a maximum of the N resources transmits.

When the first indication information indicates that no data corresponding to the first scheduling of the terminal device is transmitted on the first resource, the resource allocated to the terminal device for an eMBB service may be occupied by an ultra-reliable and low-latency communications (URLLC) service of another device, and therefore the data of the eMBB service of the terminal device cannot be transmitted on the first resource.

The following describes the eMBB service and the URLLC service in detail.

The eMBB service:

The eMBB service is mainly characterized by a comparatively large data transmission volume and a quite high transmission rate. When data of an eMBB service is transmitted, a comparatively long-time time scheduling unit is usually used to transmit the data, so as to improve data transmission efficiency. Typical eMBB services include an ultra-high-definition video, augmented reality (AR), virtual reality (VR), and the like.

The URLLC service:

The URLLC service is mainly characterized by that ultra-high reliability and an ultra-low latency are required and a data transmission volume is comparatively small and bursty. When reliability is not considered, a transmission latency of the URLLC service needs to be within 0.5 millisecond. When reliability needs to reach 99.999%, a transmission latency of the URLLC service needs to be within 1 ms. Because the URLLC service is bursty and random, the URLLC service may not generate a data packet in a quite long period of time, or may generate a plurality of data packets in a quite short period of time. These data packets are small packets (for example, data packets whose size is 50 bytes) in most cases. Typical URLLC services include tactile interactive applications such as wireless control in an industrial manufacturing or production process, motion control and remote repair of an unmanned vehicle or an unmanned aircraft, and remote surgery.

202. The terminal device receives second indication information sent by the network device.

The second indication information is used to indicate that the soft values of the first data received by the terminal device are to be processed in a first processing manner or a second processing manner, where the first processing manner and the second processing manner are different processing manners, the first data is carried on the second resource, and both the first resource and the second resource include a third resource.

It should be understood that the foregoing step 201 and step 202 may occur at the same time, or may occur in sequence (step 202 is performed after step 201, or step 201 is performed after step 202). In other words, the terminal device may receive the first indication information and the second indication information that are sent by the network device at the same time. Alternatively, the terminal device may first receive the first indication information sent by the network device, and then the terminal device receives the second indication information sent by the network device. Alternatively, the terminal device may first receive the second indication information sent by the network device, and then the terminal device receives the first indication information sent by the network device.

Optionally, when the second indication information indicates that the soft values of the first data are to be processed in the first processing manner, the second indication information may indicate that all or some of the soft values of the first data are to be processed in the first processing manner. In this case, after the terminal device receives the second indication information, the terminal device may consider that all or some of the soft values of the first data are to be processed in the first processing manner. It should be understood that when some soft values of the first data are to be processed in the first processing manner, the other soft values of the first data may be processed in the second processing manner or may be not processed.

Optionally, when the second indication information indicates that the soft values of the first data are to be processed in the second processing manner, the second indication information may indicate that all the soft values of the first data are to be processed in the second processing manner. In this case, after the terminal device receives the second indication information, the terminal device may consider that all the soft values of the first data are to be processed in the second processing manner.

Optionally, the second indication information may be code block group flushing out information (CBGFI).

Optionally, the first processing manner and the second processing manner indicate erasing the soft values of the data, and an erasing strength of the first processing manner is greater than an erasing strength of the second processing manner.

For example, when the soft values of the first data are erased in the first processing manner, most soft values (for example, 70% of all soft values of the first data) of the first data are erased. When the soft values of the first data are erased in the second processing manner, only a small part (for example, 20% of all soft values of the first data) of the first data is erased.

Optionally, that an erasing strength of the first processing manner is greater than an erasing strength of the second processing manner may also mean that an erasing coefficient of the first processing manner is greater than an erasing coefficient of the second processing manner. Values of the erasing coefficient of the first processing manner and the erasing coefficient of the second processing manner are 0 or 1, and a larger erasing coefficient indicates a larger strength of erasing the soft values of the data. When the erasing coefficient is 0, the data is not erased. When the erasing coefficient is 1, the data is completely erased.

In addition, the values of the erasing coefficients of the first processing manner and the second processing manner may be as follows: A maximum value of the erasing coefficient of the first processing manner can be set to 1, and a minimum value of the erasing coefficient of the first processing manner cannot be set to 0. A maximum value of the erasing coefficient of the second processing manner cannot be set to 1, and a minimum value of the erasing coefficient of the second processing manner can be set to 0.

For example, when the soft values of the first data are to be processed in the first processing manner, the soft values of the first data may be completely erased (the erasing coefficient of the first processing manner is 1). When the soft values of the first data are to be processed in the second processing manner, the soft values of the first data may be not erased at all (the erasing coefficient of the second processing manner is 0). Alternatively, when the soft values of the first data are to be processed in the first processing manner, 80% of the soft values of the first data may be erased (the erasing coefficient of the first processing manner is 0.8). When the soft values of the first data are to be processed in the second processing manner, 40% of the soft values of the second data may be erased (the erasing coefficient of the second processing manner is 0.4).

Optionally, the first processing manner and the second processing manner may further indicate retaining the soft values of the data, and a strength of retaining the soft values of the data in the first processing manner is less than a strength of retaining the soft values of the data in the second processing manner.

For example, when the soft values of the first data are retained in the first processing manner, only a small part of the soft values of the first data (for example, 20% of all the soft values of the first data) is retained. When the soft values of the first data are retained in the second processing manner, most of the soft values of the first data (for example, 70% of all the soft values of the first data) are retained.

Optionally, that a strength of retaining the soft values of the data in the first processing manner is less than a strength of retaining the soft values of the data in the second processing manner may also mean that a retention coefficient of the first processing manner is less than a retention coefficient of the second processing manner, where a value of the retention coefficient is 0 or 1. A larger retention coefficient indicates a larger strength of retaining the soft values of the data. When the retention coefficient is 0, the soft values of the data are not retained at all (which is equivalent to that the soft values of the data are completely erased). When the retention coefficient is 1, all of the soft values of the data are retained (which is equivalent to that the soft values of the data are not erased at all).

In addition, the values of the retention coefficients of the first processing manner and the second processing manner may be as follows: A minimum value of the retention coefficient of the first processing manner can be set to 0, and a maximum value of the retention coefficient of the first processing manner cannot be set to 1. A maximum value of the retention coefficient of the second processing manner can be set to 1, and a minimum value of the retention coefficient of the second processing manner cannot be set to 0.

For example, when the soft values of the first data are to be processed in the first processing manner, the soft values of the first data may be not retained at all (the retention coefficient of the first processing manner is 0). When the soft values of the first data are to be processed in the second processing manner, all of the soft values of the first data may be retained (the retention coefficient of the second processing manner is 1). Alternatively, when the soft values of the first data are to be processed in the first processing manner, 20% of the soft values of the first data may be retained (the retention coefficient of the first processing manner is 0.2). When the soft values of the first data are to be processed in the second processing manner, 40% of the soft values of the second data may be retained (a retention coefficient of the second processing manner is 0.4).

Optionally, in an embodiment, the second indication information includes a bit, and a value of the bit is used to indicate that the soft values of the first data are to be processed in the first processing manner or the second processing manner.

It should be understood that the second resource carried in the first data may include a plurality of resource units. For example, the second resource includes a resource unit carrying three code blocks: a CB 1, a CB 2, and a CB 3. In this case, the value of the bit in the second indication information may indicate that the soft values of the first data of the three code blocks: the CB 1, the CB 2, and the CB 3 are to be processed in the first processing manner or the second processing manner.

Optionally, when the value of the bit in the second indication information is 0, it may indicate that the soft values of the first data are to be processed in the first processing manner; and when the value of the bit in the second indication information is 1, it indicates that the soft values of the first data are to be processed in the second processing manner. Certainly, alternatively, when the value of the bit in the second indication information is 1, it may indicate that the soft values of the first data are to be processed in the first processing manner; and when the value of the bit in the second indication information is 0, it may indicate that the soft values of the first data are to be processed in the second processing manner.

Optionally, in an embodiment, the second indication information includes M bits, and the second resource includes K second resource units. A value of a $j^{th}$ bit (any one of the M bits) in the M bits is used to indicate that soft values of data carried on a $j^{th}$ second resource unit are to be processed in the first processing manner or the second processing manner, bit values corresponding to the K second resource units are the same, both K and M are integers greater than 0, and K≤M.

Figure 3:
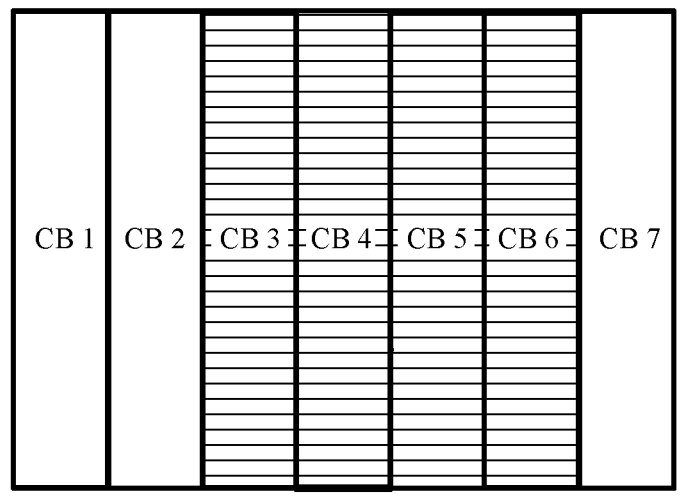
FIG. 3 is a schematic diagram of a first resource and a second resource.

For example, as shown in FIG. 3, the second resource is a resource carrying a CB 3, a CB 4, a CB 5, and a CB 6, and the second indication information includes four bits. In this case, a first bit of the second indication information may indicate that soft values of data of the CB 1 and the CB 2 are to be processed in the second processing manner, a second bit of the second indication information may indicate that soft values of data of the CB 3 and the CB 4 are to be processed in the first processing manner, a third bit of the second indication information may indicate that soft values of data of the CB 5 and the CB 6 are to be processed in the first processing manner, and a fourth bit of the second indication information may indicate that soft values of data of a CB 7 are to be processed in the second processing manner. In other words, one bit of the second indication information may indicate a processing manner of soft values of data of a plurality of code blocks (which is equivalent to that one bit may indicate one code block group) at the same time.

It should be understood that second-resource units of the second resource may be adjacent to each other, or may be non-adjacent. In other words, the second resource may include consecutive second-resource units, or may include inconsecutive second-resource units.

203. The terminal device determines a target processing manner from the first processing manner and the second processing manner based on the first indication information and/or the second indication information.

Optionally, the terminal device may select one processing manner from the first processing manner and the second processing manner as the target processing manner, or may determine both the first processing manner and the second processing manner as the target processing manner. When both the first processing manner and the second processing manner are the target processing manner, the soft values of the data in the resource included in both the first resource and the second resource need to be used separately in the first processing manner and the second processing manner.

204. The terminal device processes soft values of data in the third resource in the target processing manner.

In this application, a processing manner of soft values of data on some resources in an intersection set of the first resource and the second resource can be determined by comprehensively considering the first indication information and the second indication information or considering only one of the first indication information and the second indication information.

Optionally, in an embodiment, that the terminal device determines a target processing manner from the first processing manner and the second processing manner based on the first indication information and/or the second indication information includes: When the second indication information indicates that the soft values of the first data are to be processed in the second processing manner, the terminal device determines the second processing manner as the target processing manner.

When the second indication information indicates that the soft values of the first data are to be processed in the second processing manner, the second processing manner is directly determined as the target processing manner based on the second indication information. This can reduce data processing complexity and improve data processing efficiency.

In other words, when the second indication information indicates that the soft values of the first data are to be processed in the second processing manner, regardless of whether the first indication information indicates that the data corresponding to the first scheduling of the terminal device is transmitted on the first resource, the second processing manner is determined as the target processing manner. It should be understood that when the second indication information indicates that the soft values of the first data are to be processed in the second processing manner, the terminal device determines the target processing manner based on the indication of the second indication information, and directly determines the target processing manner based on the indication of the second indication information, without considering specific content indicated by the first indication information.

For example, when the second processing manner indicates no erasing, the second indication information indicates that the soft values of the first data are not to be erased, and therefore the terminal device determines not to erase the soft values of the data in the third resource.

Optionally, in an embodiment, that the terminal device determines a target processing manner from the first processing manner and the second processing manner based on the first indication information and/or the second indication information includes: When the second indication information indicates that the soft values of the first data are to be processed in the first processing manner, and the first indication information indicates that the data corresponding to the first scheduling is to be transmitted on the first resource, the terminal device determines the second processing manner as the target processing manner.

The target processing manner can be more appropriately determined by comprehensively considering the first indication information and the second indication information.

When the second indication information indicates that the soft values of the first data are to be processed in the first processing manner, the target processing manner may be determined with reference to the first indication information. When the first indication information indicates that the data corresponding to the first scheduling is transmitted on the first resource, a corresponding processing manner is the second processing manner. When the first indication information indicates that no data corresponding to the first scheduling is transmitted on the first resource, a corresponding processing manner is the first processing manner.

For example, when the first processing manner indicates erasing, and the second processing manner indicates no erasing, if the second indication information indicates erasing the soft values of the first data, and the first indication information indicates that the data corresponding to the first scheduling is transmitted on the first resource, it may be determined, based on an indication of the first indication information, that the soft values of the data in the third resource are not to be erased.

In this application, in addition to determining the target processing manner based on the first indication information and the second indication information, an inclusion relationship between the first resource and the second resource may be further considered to comprehensively determine the target processing manner. The inclusion relationship between the first resource and the second resource herein may be whether the first resource is a subset of the second resource, or whether the second resource is a subset of the first resource.

Optionally, in an embodiment, that the terminal device determines a target processing manner from the first processing manner and the second processing manner based on the first indication information and/or the second indication information includes the following two cases:

(1) When the second indication information indicates that the soft values of the first data are to be processed in the first processing manner, the first indication information indicates that the data corresponding to the first scheduling of the terminal device is transmitted on the first resource, and the first resource is a subset of the second resource, the terminal device determines the second processing manner as the target processing manner.

Figure 4:
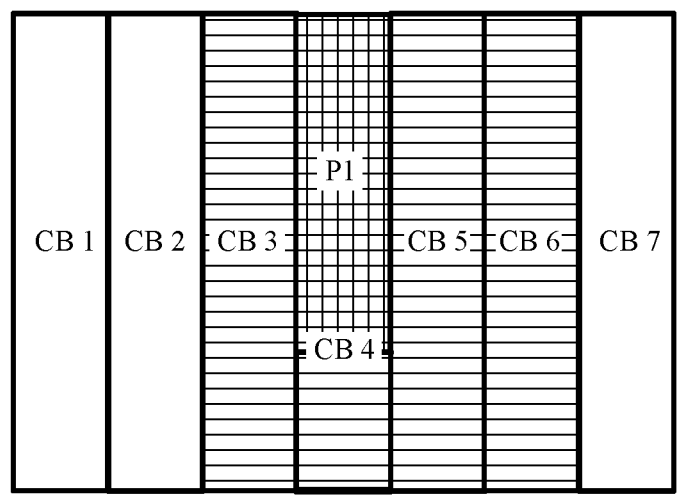
FIG. 4 is a schematic diagram of a first resource and a second resource.

For example, as shown in FIG. 4, the first resource is P1, the second resource is a resource carrying a CB 3, a CB 4, a CB 5, and a CB 6, P1 is completely included in a resource carrying the CB 4, and the first resource is a subset of the second resource. In this case, if the second indication information indicates that the soft values of the first data are to be processed in the first processing manner, and the first indication information indicates that the data corresponding to the first scheduling of the terminal device is transmitted on the first resource, the terminal device determines the second processing manner as the target processing manner. In other words, the terminal device determines to process soft values of data in P1 (P1 herein is a resource included in both the first resource and the second resource) in the second processing manner.

(2) When the second indication information indicates that the soft values of the first data are to be processed in the first processing manner, the first indication information indicates that the data corresponding to the first scheduling of the terminal device is transmitted on the first resource, and the first resource is not a subset of the second resource, the terminal device determines the first processing manner as the target processing manner.

Figure 5:
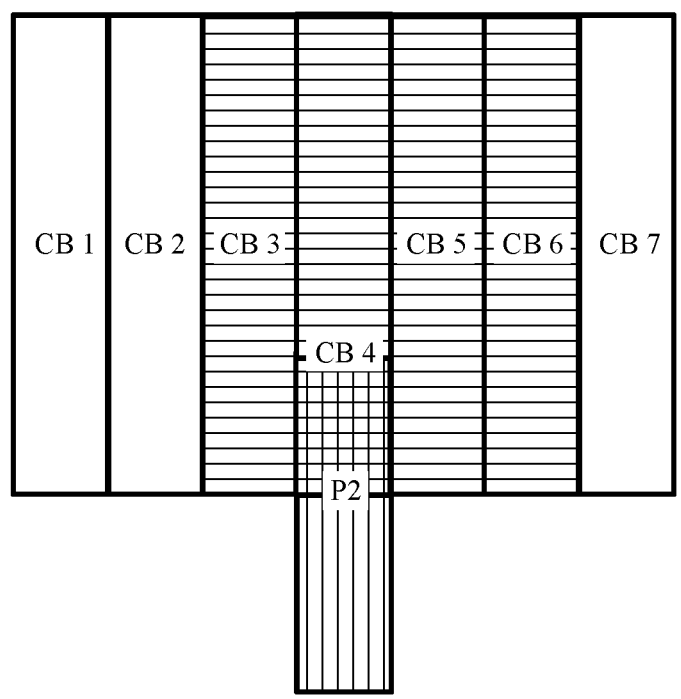
FIG. 5 is a schematic diagram of a first resource and a second resource.

For example, as shown in FIG. 5, the first resource is P2, the second resource is a resource carrying a CB 3, a CB 4, a CB 5, and a CB 6, only a part of P2 is included in the resource carrying the CB 4, and the first resource is not a subset of the second resource. In this case, if the second indication information indicates that the soft values of the first data are to be processed in the first processing manner, and the first indication information indicates that the data corresponding to the first scheduling of the terminal device is transmitted on the first resource, the terminal device determines the first processing manner as the target processing manner, namely, the terminal device determines to process soft values of data on a resource included in both the first resource and the second resource (an intersection part of P2 and the resource carrying the CB 4) in the first processing manner.

In the foregoing two cases, when the second indication information indicates that the soft values of the first data are to be processed in the first processing manner, and the first indication information indicates that the data corresponding to the first scheduling of the terminal device is transmitted on the first resource, the terminal device needs to further determine whether the first resource is a subset of the second resource, and afterwards determine the target processing manner. Therefore, that the terminal device determines a target processing manner from the first processing manner and the second processing manner based on the first indication information and/or the second indication information may be alternatively represented in the following form:

when the second indication information indicates that the soft values of the first data are to be processed in the first processing manner, and the first indication information indicates that the data corresponding to the first scheduling of the terminal device is transmitted on the first resource, the inclusion relationship between the first resource and the second resource is determined (or whether the first resource is a subset of the second resource is determined); and when the first resource is a subset of the second resource, the terminal device determines the second processing manner as the target processing manner; or when the first resource is not a subset of the second resource, the terminal device determines the first processing manner as the target processing manner.

It should be understood that when the first resource is a subset of the second resource, the third resource is the first resource. When the first resource is not a subset of the second resource, the third resource is a resource included in both the first resource and the second resource (or referred to as a partially overlapping resource). In addition, in this application, that the first resource is not a subset of the second resource is equivalent to that the first resource partially overlaps with the second resource (the first resource is not a subset of the second resource, the second resource is not a subset of the first resource, and the first resource partially overlaps with the second resource).

When the target processing manner is determined, in addition to the first indication information and the second indication information, whether the first resource is a subset of the second resource is further considered, to determine the target processing manner. Therefore, when the target processing manner is determined, an inclusion status of the first resource and the second resource can be considered, to appropriately determine the target processing manner.

Optionally, when the first resource is not a subset of the second resource, that is, when the first resource partially overlaps with the second resource, in addition to determining the target processing manner based on the indication of the first indication information and the indication of the second indication information, the target processing manner may be further determined by determining a proportion of the third resource included in both the first resource and the second resource in the first resource (or a ratio of a size of the third resource to a size of the first resource).

Optionally, that the terminal device determines a target processing manner from the first processing manner and the second processing manner based on the first indication information and/or the second indication information includes:

when the second indication information indicates that the soft values of the first data are to be processed in the first processing manner, the first indication information indicates that the data corresponding to the first scheduling of the terminal device is transmitted on the first resource, and the first resource is not a subset of the second resource, the terminal device determines the ratio of the size of the third resource to the size of the first resource; and when the ratio of the size of the third resource to the size of the first resource exceeds a preset threshold, the terminal device determines the second processing manner as the target processing manner; or when the ratio of the size of the third resource to the size of the first resource is less than or equal to a preset threshold, the terminal device determines the first processing manner as the target processing manner.

In addition, that the terminal device determines a target processing manner from the first processing manner and the second processing manner based on the first indication information and/or the second indication information may alternatively be directly represented as the following two cases:

(3) When the second indication information indicates that the soft values of the first data are to be processed in the first processing manner, the first indication information indicates that the data corresponding to the first scheduling of the terminal device is transmitted on the first resource, the first resource is not a subset of the second resource, and the ratio of the size of the third resource to the size of the first resource exceeds a preset threshold, the terminal device determines the second processing manner as the target processing manner.

(4) When the second indication information indicates that the soft values of the first data are to be processed in the first processing manner, the first indication information indicates that the data corresponding to the first scheduling of the terminal device is transmitted on the first resource, the first resource is not a subset of the second resource, and the ratio of the size of the third resource to the size of the first resource is less than or equal to a preset threshold, the terminal device determines the first processing manner as the target processing manner.

It should be understood that when the ratio of the size of the third resource to the size of the first resource exceeds the preset threshold, it may be considered that the third resource occupies a larger proportion of the first resource. In this case, the target processing manner may be determined based on the indication of the first indication information.

When the ratio of the size of the third resource to the size of the first resource is less than or equal to the preset threshold, it may be considered that the third resource occupies a smaller proportion of the first resource. In this case, the target processing manner may be determined based only on the second indication information.

Optionally, when the target processing manner is determined based on a value relationship between the ratio of the size of the third resource to the size of the first resource and the preset threshold, the second processing manner may be further determined as the target processing manner when the ratio of the size of the third resource to the size of the first resource is greater than or equal to the preset threshold, and the first processing manner is determined as the target processing manner when the ratio of the size of the third resource to the size of the first resource is less than the preset threshold.

With reference to the proportion of the third resource in the first resource, the target processing manner can be more appropriately determined based on importance of the third resource in the first resource (when the proportion of the third resource in the first resource is larger, it may be considered that the importance of the third resource is higher).

Optionally, when the second resource is a subset of the first resource, an indication granularity of the second indication information is smaller (a resource corresponding to the second indication information is smaller), and the target processing manner may be determined more accurately based on an indication of the second indication information. Therefore, in scenario 2, the target processing manner may be determined from the first processing manner and the second processing manner based only on the indication of the second indication information.

Figure 6:
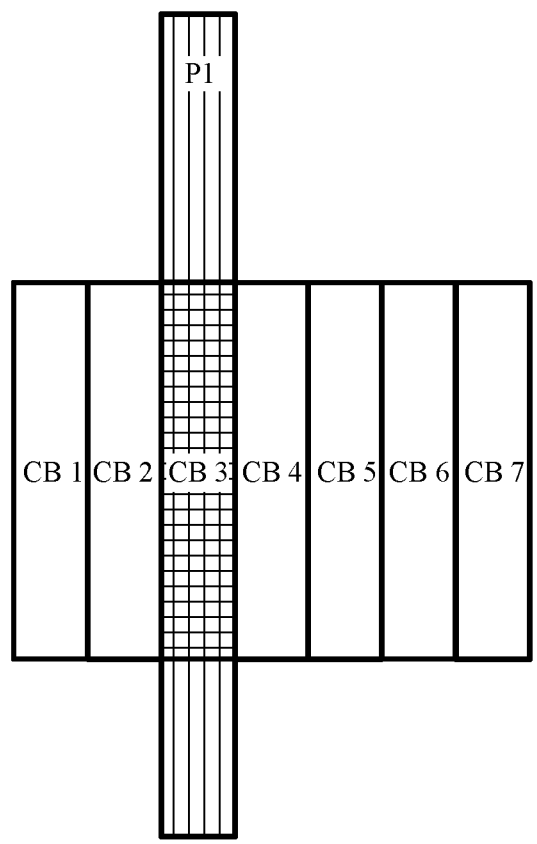
FIG. 6 is a schematic diagram of a first resource and a second resource.

For example, as shown in FIG. 6, the first resource is P1, the second resource is a resource carrying a CB 3, the resource carrying the CB 3 is completely included in P1, and the second resource is a subset of the first resource.

Optionally, in an embodiment, that the terminal device determines a target processing manner from the first processing manner and the second processing manner based on the first indication information and/or the second indication information includes:

when the second indication information indicates that the soft values of the first data are to be processed in the first processing manner, and the second resource is a subset of the first resource, the terminal device determines the first processing manner as the target processing manner; or when the second indication information indicates that the soft values of the first data are to be processed in the second processing manner, and the second resource is a subset of the first resource, the terminal device determines the second processing manner as the target processing manner.

Optionally, when the first resource is a subset of the second resource, because an indication granularity of the first indication information is smaller (a resource corresponding to the first indication information is smaller), the target processing manner may be determined more accurately based on the indication of the first indication information. Therefore, the terminal device may determine the target processing manner from the first processing manner and the second processing manner based only on the indication of the first indication information.

Optionally, in an embodiment, that the terminal device determines a target processing manner from the first processing manner and the second processing manner based on the first indication information and/or the second indication information includes:

when the first indication information indicates that the data corresponding to the first scheduling of the terminal device is transmitted on the first resource, and the first resource is a subset of the second resource, the terminal device determines the second processing manner as the target processing manner; or when the first indication information indicates that no data corresponding to the first scheduling of the terminal device is transmitted on the first resource, and the first resource is a subset of the second resource, the terminal device determines the first processing manner as the target processing manner.

It should be understood that in this application, when the target processing manner is determined based on the first indication information and/or the second indication information, the target processing manner may be determined with reference to different scenarios. Alternatively, to further reduce implementation complexity, the target processing manner may be directly determined based on the first indication information or the second indication information without considering the scenarios. In some embodiments, the following two cases may be included:

(5) The terminal device directly determines the target processing manner based on the first indication information without considering the second indication information. When the first indication information indicates that no data corresponding to the first scheduling of the terminal device is transmitted on the first resource, the terminal device determines the first processing manner as the target processing manner. When the first indication information indicates that the data corresponding to the first scheduling of the terminal device is transmitted on the first resource, the terminal device determines the second processing manner as the target processing manner.

(6) The terminal device directly determines the target processing manner based on the second indication information without considering the first indication information. When the second indication information indicates that the soft values of the first data are to be processed in the first processing manner, the terminal device determines the first processing manner as the target processing manner. When the second indication information indicates that the soft values of the first data are to be processed in the second processing manner, the terminal device determines the second processing manner as the target processing manner.

In this application, indication of the first indication information and indication of the second indication information may include a first case and a second case.

The first case includes: The first indication information indicates that the data corresponding to the first scheduling is transmitted on the first resource, and the second indication information indicates that the soft values of the first data are to be processed in the first processing manner.

The second case includes: The first indication information indicates that no data corresponding to the first scheduling is transmitted on the first resource, and the second indication information indicates that the soft values of the first data are to be processed in the second processing manner.

Optionally, in the first case or the second case, in addition to the first indication information and the second indication information, a target modulation scheme may be further determined with reference to a modulation scheme.

Optionally, in an embodiment, that the terminal device determines a target processing manner from the first processing manner and the second processing manner based on the first indication information and/or the second indication information includes:

in the first case or the second case, the terminal device determines a modulation scheme of the data carried in the third resource; and when the third resource carries data whose modulation scheme is different from a modulation scheme indicated by the first scheduling, the first processing manner is determined as the target processing manner.

It should be understood that the modulation scheme of the third resource may be a modulation scheme corresponding to the data carried on the third resource, and the data carried on the third resource may be corresponding to a plurality of modulation schemes. When determining that any one of the plurality of modulation schemes is different from the modulation scheme indicated by the first scheduling, the first processing manner may be determined as the target processing manner. When the modulation scheme corresponding to the data carried on the third resource is exactly the same as the modulation scheme indicated by the first scheduling, the second processing manner is determined as the target processing manner.

Optionally, in the first case or the second case, both the first processing manner and the second processing manner may be determined as the target processing manner. In this way, when the soft values of the first data are processed, the soft values of the first data may be separately processed in the two processing manners.

It should be understood that when both the first processing manner and the second processing manner are determined as the target processing manner, the soft values of the first data may be processed separately in the two manners, and separately attempt to be decoded, and a next operation is determined based on a decoding status.

In addition, when the first indication information is inconsistent with the second indication information, that the terminal device determines a target processing manner from the first processing manner and the second processing manner includes: The terminal device determines the modulation scheme of the third resource included in both the first resource and the second resource; when the third resource carries data whose modulation scheme is different from the modulation scheme indicated by the first scheduling, the terminal device determines the first processing manner as the target processing manner; or when the indication of the first indication information is inconsistent with the indication of the second indication information, the terminal device can comparatively accurately determine, by determining the modulation scheme, a processing manner used to process the soft values of the third resource.

To better understand the data processing method in the embodiments of this application, the following describes in detail the data processing method in the embodiments of this application by using an example in which the first indication information is discontinuous transmission indication information and the second indication information is CBGFI.

It should be understood that, in example 1 to example 5, erasing processing may be equivalent to the first processing manner in the foregoing description, and a no erasing processing may be equivalent to the second processing manner in the foregoing description. The erasing processing may be erasing all soft values of data in a resource, or may be erasing only some of the soft values. The no erasing processing may be that none or only some of soft values of data in a resource are erased, and an erasing strength of the erasing processing is greater than an erasing strength of the no erasing processing.

Example 1

Figure 7:
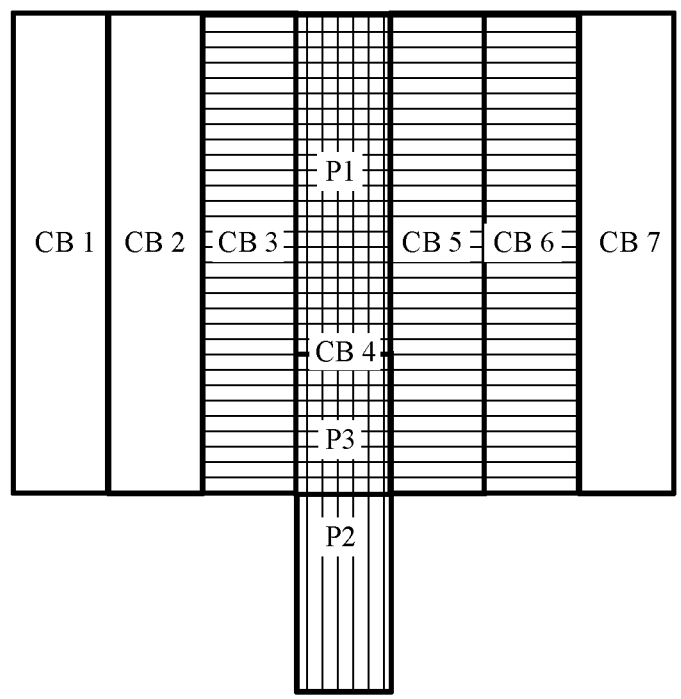
FIG. 7 is a schematic diagram of a first resource and a second resource.

As shown in FIG. 7, the second resource is a resource carrying a CB 3, a CB 4, a CB 5, and a CB 6, and the first resource is P1 or P2. When the first resource is P1, the first resource is a subset of the second resource, and the third resource included in both the first resource and the second resource is the first resource P1. When the first resource is P2, the first resource is not a subset of the second resource, and the third resource included in both the first resource and the second resource is a partial resource P3 in P2.

When the CBGFI indicates that soft values of data in the CB 3, the CB 4, the CB 5, and the CB 6 are not to be erased, it is determined that soft values of data in P3 are not erased.

However, when the CBGFI indicates that soft values of data in the CB 3, the CB 4, the CB 5, and the CB 6, and the discontinuous transmission indication information indicates that the data corresponding to the first scheduling is transmitted on the first resource, whether to erase soft values of data in the third resource may be determined in the following two cases based on whether the first resource is a subset of the second resource:

(7) If the first resource is P1 (the first resource is a subset of the second resource), the terminal device determines, based on an indication of the discontinuous transmission indication information, not to erase soft values of data in P1.

(8) If the first resource is P2 (the first resource is not a subset of the second resource), the terminal device determines, based the indication of the CBGFI, to erase the soft values of the data in P3.

Example 2

Figure 8:
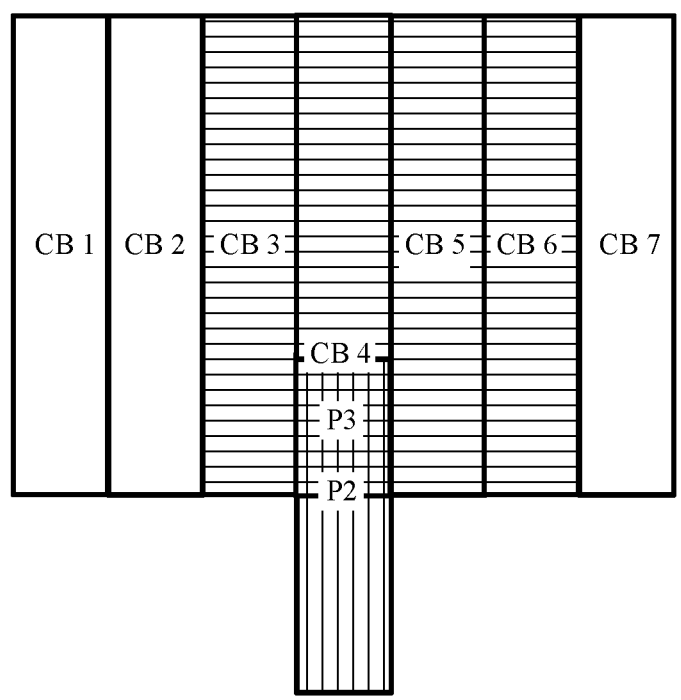
FIG. 8 is a schematic diagram of a first resource and a second resource.

As shown in FIG. 8, the second resource is a resource carrying a CB 3, a CB 4, a CB 5, and a CB 6, the first resource is P2, P2 is not a subset of the second resource, and a third resource included in both the first resource and the second resource is a partial resource P3 in P2.

When the CBGFI indicates that soft values of data in the CB 3, the CB 4, the CB 5, and the CB 6 are to be erased, the terminal device determines not to erase soft values of data in P3, without considering the discontinuous transmission indication information; or when the CBGFI indicates that soft values of data in the CB 3, the CB 4, the CB 5, and the CB 6 are not to be erased, and the discontinuous transmission indication information indicates that the data corresponding to the first scheduling is transmitted on P2, the terminal device determines that a ratio of a size of P3 to a size of P2 is a first ratio; and determines, based on a value relationship between the first ratio and a preset threshold, whether to erase the soft values of the data in P3.

In some embodiments, the terminal device determines, based on a value relationship between the first ratio and the preset threshold, whether to erase the soft values of the data in P3 in the following two cases:

(9) When the first ratio exceeds the preset threshold, the terminal device determines not to erase the soft values of the data in P3.

(10) When the first ratio is less than or equal to the preset threshold, the terminal device determines to erase the soft values of the data in P3.

Example 3

Figure 9:
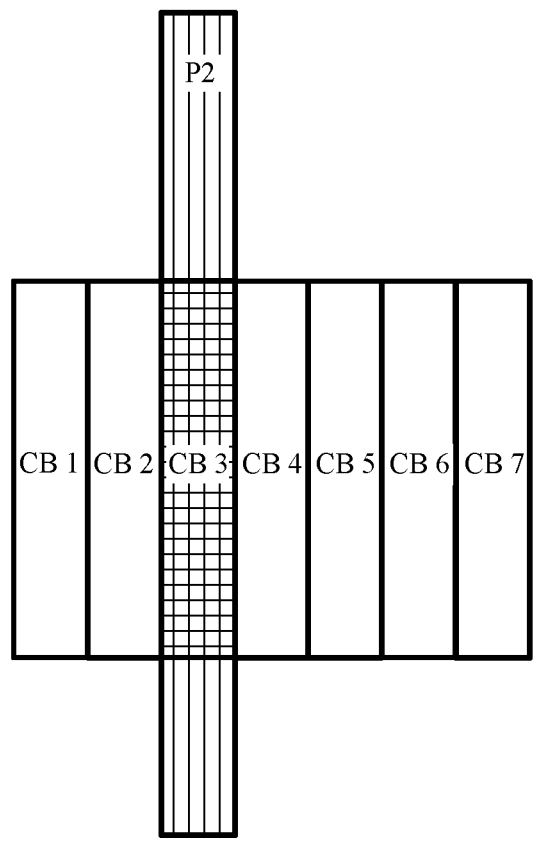
FIG. 9 is a schematic diagram of a first resource and a second resource.

As shown in FIG. 9, the first resource is P2, the second resource is a resource carrying a CB 3, the resource carrying the CB 3 is completely included in P2, and the second resource is a subset of the first resource. The third resource included in both the first resource and the second resource is a resource carrying the CB 3. Because the resource carrying the CB 3 is a subset of P2, whether to erase soft values of data in the CB 3 may be determined based on the indication of the CBGFI. In some embodiments, the following two cases are included:

(11) When the CBGFI indicates that the soft values of the data in the CB 3 are to be erased, the terminal device determines to erase the soft values of the data in the CB 3.

(12) When the CBGFI indicates that the soft values of the data in the CB 3 are not to be erased, the terminal device determines not to erase the soft values of the data in the CB 3.

Similar to the Embodiment 3, when the first resource is a subset of the second resource, whether to erase soft values of data in a third resource may be further determined based on an indication of discontinuous transmission indication information. Details are shown in Example 4.

Example 4

Figure 10:
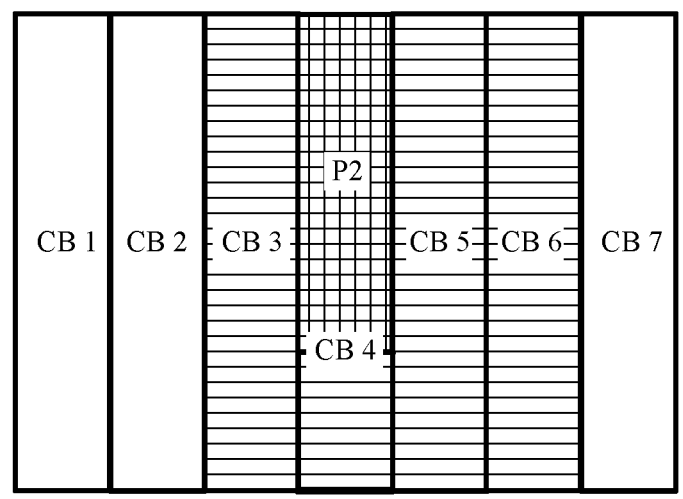
FIG. 10 is a schematic diagram of a first resource and a second resource.

As shown in FIG. 10, the first resource is P2, the second resource is a resource carrying a CB 3, a CB 4, a CB 5, and a CB 6, P2 is completely included in the resource carrying the CB 4, and the first resource is a subset of the second resource. The third resource included in both the first resource and the second resource is the first resource P2. Because P2 is a subset of the resource carrying the CB 4, whether to erase soft values of data in P2 may be determined based on an indication of discontinuous transmission indication information. In some embodiments, the following two cases are included:

(13) When the discontinuous transmission indication information indicates that the data corresponding to the first scheduling of the terminal device is transmitted on P2, the terminal device determines not to erase the soft values of the data in P2.

(14) When the discontinuous transmission indication information indicates that no data corresponding to the first scheduling of the terminal device is transmitted on P2, the terminal device determines to erase the soft values of the data in P2.

Example 5

Figure 11:
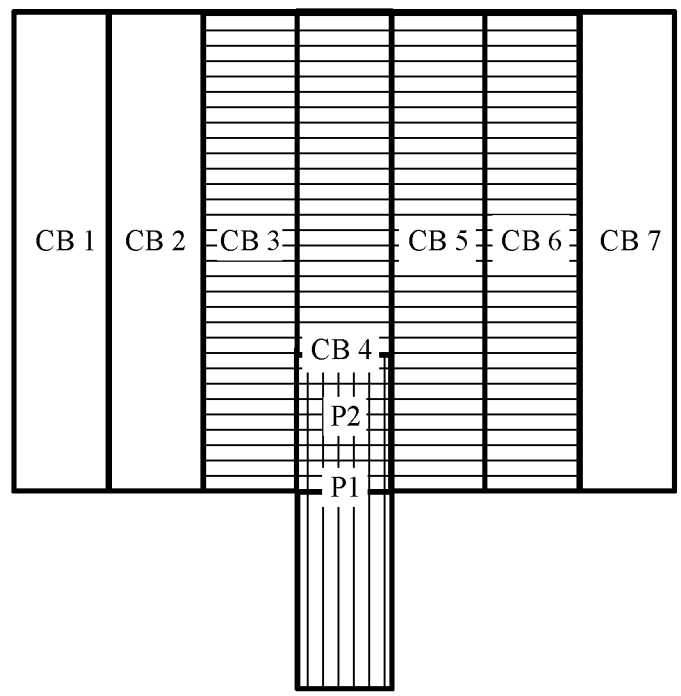
FIG. 11 is a schematic diagram of a first resource and a second resource.

As shown in FIG. 11, the first resource is P1, the second resource is a resource carrying a CB 3, a CB 4, a CB 5, and a CB 6, and the first resource and the second resource include a common resource P2. In this case, the terminal device determines to erase soft values of data in P2 only when the CBGFI indicates that soft values of data in the CB 3, the CB 4, the CB 5, and the CB 6 are to be erased and the discontinuous transmission indication information indicates that no data corresponding to the first scheduling of the terminal device is transmitted on P1; while in other cases, the terminal device determines not to erase the soft values of the data in P2.

In some embodiments, whether to erase the soft values of the data in P2 may be determined according to a relationship shown in Table 1.

TABLE 1

|  | Discontinuous transmission indication information indicates transmission | Discontinuous transmission indication information indicates no transmission |
|---|---|---|
| The CBGFI indicates erasing | Not erase | Erase |
| The CBGFI indicates no erasing | Not erase | Not erase |

It should be understood that, in Table 1, that the CBGFI indicates erasing means erasing the soft values of the data in the CB 3, the CB 4, the CB 5, and the CB 6, and that the CBGFI indicates no erasing means not erasing the soft values of the data in the CB 3, the CB 4, the CB 5, and the CB 6. The discontinuous transmission indication information indicates transmission means that the data corresponding to the first scheduling of the terminal device is transmitted on P1. The discontinuous transmission indication information indicates no transmission means that no data corresponding to the first scheduling of the terminal device is transmitted on P1. It can be learned from Table 1 that, when either indication information of the CBGFI and the discontinuous transmission indication information indicates no erasing or transmission, the terminal device determines not to erase the soft values of the data in P2. The terminal device determines to erase the soft values of the data in P2, only when the CBGFI indicates erasing and the discontinuous transmission indication information indicates no transmission.

The foregoing describes in detail the data processing method in the embodiments of this application with reference to FIG. 2 to FIG. 11. The following describes in detail the terminal device in the embodiments of this application with reference to FIG. 12 to FIG. 13. It should be understood that the data processing method in the embodiments of this application may be performed by the terminal device in FIG. 12 to FIG. 13. For brevity, repeated descriptions are appropriately omitted below.

Figure 12:
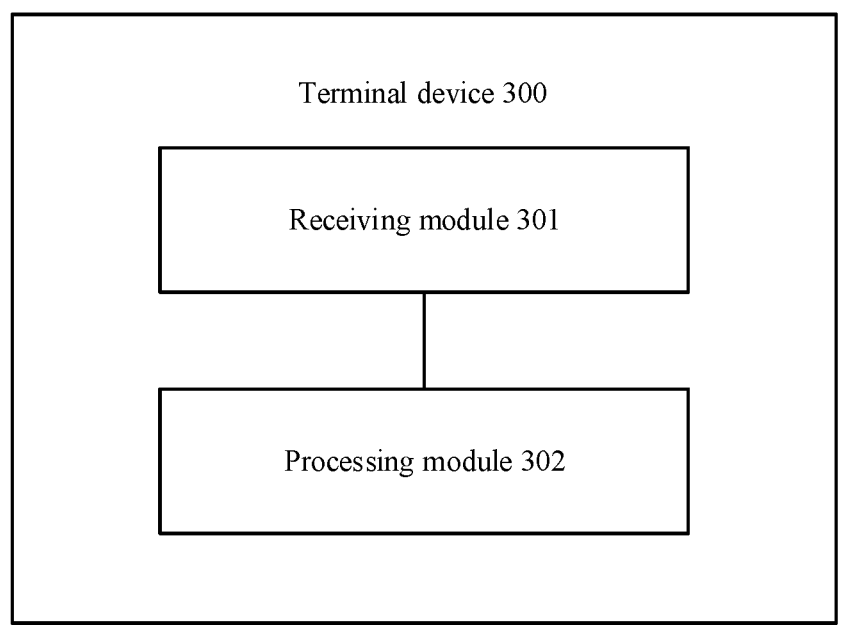
FIG. 12 is a schematic block diagram of a terminal device according to an embodiment of this application.

FIG. 12 is a schematic block diagram of a terminal device according to an embodiment of this application. A terminal device 300 shown in FIG. 12 can perform the data processing method in the embodiments of this application. The terminal device 300 includes a receiving module 301 and a processing module 302.

The receiving module 301 is configured to receive first indication information sent by a network device, where the first indication information is used to indicate whether data corresponding to first scheduling of the terminal device is transmitted on a first resource, and there is an intersection set between the first resource and a resource corresponding to the first scheduling.

The receiving module 301 is further configured to receive second indication information sent by the network device, where the second indication information is used to indicate that soft values of first data received by the terminal device are to be processed in a first processing manner or a second processing manner, the first processing manner and the second processing manner are different processing manners, the first data is carried on a second resource, and both the first resource and the second resource include a third resource.

The processing module 302 is configured to determine a target processing manner from the first processing manner and the second processing manner based on the first indication information and/or the second indication information.

The processing module 302 is further configured to process soft values of data in the third resource in the target processing manner.

In this application, a processing manner of soft values of data on some resources in an intersection set of the first resource and the second resource can be determined by comprehensively considering the first indication information and the second indication information or considering only one of the first indication information and the second indication information.

Optionally, in an embodiment, the processing module 302 is configured to: when the second indication information indicates that the soft values of the first data are to be processed in the second processing manner, determine, by the terminal device, the second processing manner as the target processing manner.

Optionally, in an embodiment, the processing module 302 is configured to: when the second indication information indicates that the soft values of the first data are to be processed in the first processing manner, and the first indication information indicates that the data corresponding to the first scheduling is transmitted on the first resource, determine, by the terminal device, the second processing manner as the target processing manner.

Optionally, in an embodiment, the processing module 302 is configured to: when the second indication information indicates that the soft values of the first data are to be processed in the first processing manner, the first indication information indicates that the data corresponding to the first scheduling of the terminal device is transmitted on the first resource, and the first resource is a subset of the second resource, determine, by the terminal device, the second processing manner as the target processing manner.

Optionally, in an embodiment, the processing module 302 is configured to: when the second indication information indicates that the soft values of the first data are to be processed in the first processing manner, the first indication information indicates that the data corresponding to the first scheduling of the terminal device is transmitted on the first resource, and the first resource is not a subset of the second resource, determine, by the terminal device, the first processing manner as the target processing manner.

Optionally, in an embodiment, the processing module 302 is configured to: when the second indication information indicates that the soft values of the first data are to be processed in the first processing manner, the first indication information indicates that the data corresponding to the first scheduling of the terminal device is transmitted on the first resource, and the first resource is not a subset of the second resource, determine, by the terminal device, a ratio of a size of the third resource to a size of the first resource; and when the ratio of the size of the third resource to the size of the first resource exceeds a preset threshold, determine, by the terminal device, the second processing manner as the target processing manner; or when the ratio of the size of the third resource to the size of the first resource is less than or equal to the preset threshold, determine, by the terminal device, the first processing manner as the target processing manner.

Optionally, in an embodiment, the processing module 302 is configured to: when the second indication information indicates that the soft values of the first data are to be processed in the first processing manner, and the second resource is a subset of the first resource, determine, by the terminal device, the first processing manner as the target processing manner; or when the second indication information indicates that the soft values of the first data are to be processed in the second processing manner, and the second resource is a subset of the first resource, determine, by the terminal device, the second processing manner as the target processing manner.

Optionally, in an embodiment, the processing module 302 is configured to: when the first indication information indicates that the data corresponding to the first scheduling of the terminal device is transmitted on the first resource, and the first resource is a subset of the second resource, determine, by the terminal device, the second processing manner as the target processing manner; or when the first indication information indicates that no data corresponding to the first scheduling of the terminal device is transmitted on the first resource, and the first resource is a subset of the second resource, determine, by the terminal device, the first processing manner as the target processing manner.

Optionally, in an embodiment, the processing module 302 is configured to: determine, by the terminal device in a first case or a second case, a modulation scheme of the data carried on the third resource; and when the third resource carries the data whose modulation scheme is different from a modulation scheme indicated by the first scheduling, determine the first processing manner as the target processing manner. The first case includes: The first indication information indicates that the data corresponding to the first scheduling is transmitted on the first resource, and the second indication information indicates that the soft values of the first data are to be processed in the first processing manner. The second case includes: The first indication information indicates that no data corresponding to the first scheduling is transmitted on the first resource, and the second indication information indicates that the soft values of the first data are to be processed in the second processing manner.

Optionally, in an embodiment, when the first indication information indicates that the data corresponding to the first scheduling of the terminal is transmitted on the first resource, the first indication information indicates that the entire first resource is used to transmit data that is corresponding to L times of scheduling of L devices and that is on the first resource, where the L devices are in a one-to-one correspondence with the L times of scheduling, the L devices include the terminal device, the L times of scheduling include the first scheduling, and L is an integer greater than 0.

Optionally, in an embodiment, when the first indication information indicates that no data corresponding to the first scheduling of the terminal device is transmitted on the first resource, the first indication information indicates that a part or none of the first resource is used to transmit data that is corresponding to L times of scheduling of L devices and that is on the first resource, where the L devices are in a one-to-one correspondence with the L times of scheduling, the L devices include the terminal device, the L times of scheduling include the first scheduling, and L is an integer greater than 0.

Optionally, in an embodiment, when the second indication information indicates that the soft values of the first data are to be processed in the first processing manner, the second indication information indicates that all or some of the soft values of the first data are to be processed in the first processing manner.

Optionally, in an embodiment, the first processing manner and the second processing manner indicate erasing soft values of data, where an erasing strength the soft values of the data in the first processing manner is greater than an erasing strength the soft values of the data in the second processing manner.

Optionally, in an embodiment, the first processing manner and the second processing manner indicate retaining soft values of data, where a strength of retaining the soft values of the data in the first processing manner is less than a strength of retaining the soft values of the data in the second processing manner.

Figure 13:
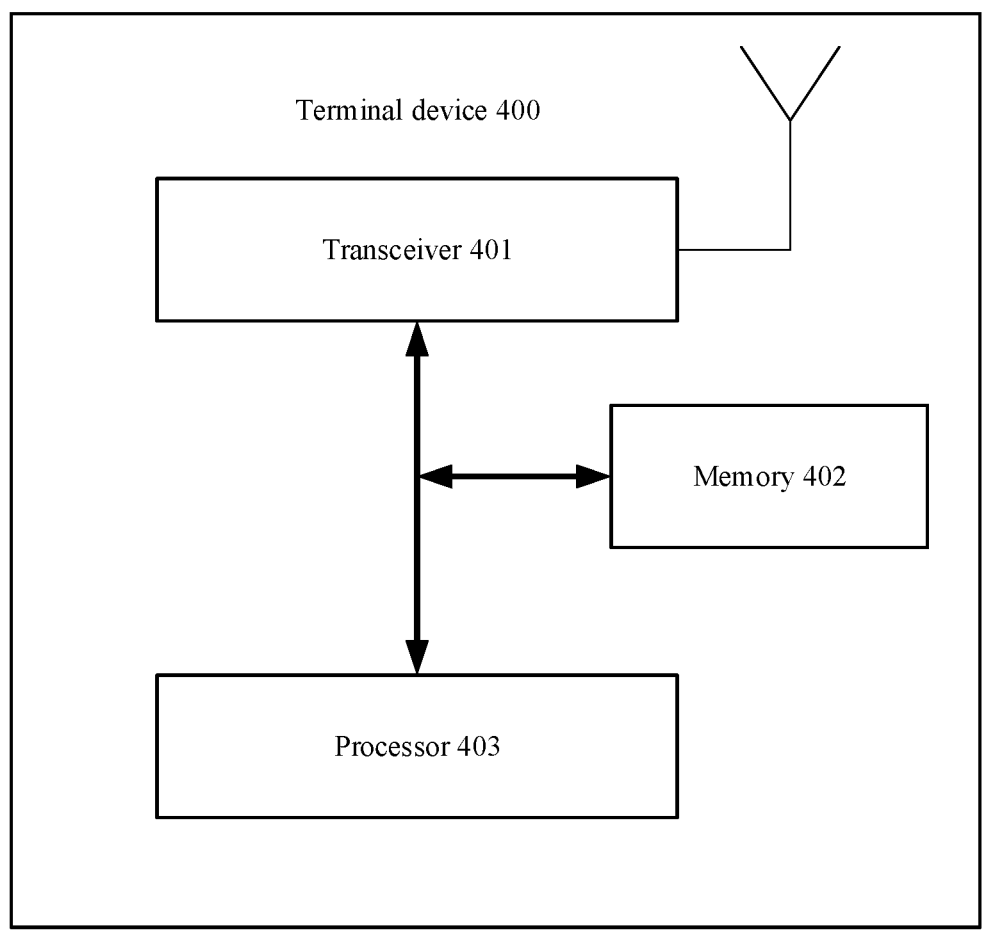
FIG. 13 is a schematic block diagram of a terminal device according to an embodiment of this application.

FIG. 13 is a schematic block diagram of a terminal device according to an embodiment of this application. The terminal device 400 shown in FIG. 13 can perform the data processing method in the embodiments of this application. The terminal device 400 includes a transceiver 401, a memory 402, and a processor 403.

The transceiver 401 is configured to receive first indication information sent by a network device, where the first indication information is used to indicate whether data corresponding to first scheduling of the terminal device is transmitted on a first resource, and there is an intersection set between the first resource and a resource corresponding to the first scheduling.

The transceiver 401 is further configured to receive second indication information sent by the network device, where the second indication information is used to indicate that soft values of first data received by the terminal device are to be processed in a first processing manner or a second processing manner, the first processing manner and the second processing manner are different processing manners, the first data is carried on a second resource, and both the first resource and the second resource include a third resource.

The memory 402 is configured to store software.

The processor 403 is configured to execute the program stored in the memory 402. When the program stored in the memory 402 is executed, the processor 403 is configured to: determine a target processing manner from the first processing manner and the second processing manner based on the first indication information and/or the second indication information, and process soft values of data in the third resource in the target processing manner.

The transceiver 401 and the processor 403 may include a large quantity of transistors, logic gate circuits, or circuit components. The transceiver 401 and the processor 403 may be located on different chips or a same chip. The memory 402 is usually located on an independent chip, or may be located on a same chip as the transceiver 401 and the processor 403. Further, the transceiver 401 may be coupled to one or more antennas.

In this application, a processing manner of soft values of data on some resources in an intersection set of the first resource and the second resource can be determined by comprehensively considering the first indication information and the second indication information or considering only one of the first indication information and the second indication information.

Optionally, in an embodiment, the processor 403 is configured to: when the second indication information indicates that the soft values of the first data are to be processed in the second processing manner, determine, by the terminal device, the second processing manner as the target processing manner.

Optionally, in an embodiment, the processor 403 is configured to: when the second indication information indicates that the soft values of the first data are to be processed in the first processing manner, and the first indication information indicates that the data corresponding to the first scheduling is transmitted on the first resource, determine, by the terminal device, the second processing manner as the target processing manner.

Optionally, in an embodiment, the processor 403 is configured to: when the second indication information indicates that the soft values of the first data are to be processed in the first processing manner, the first indication information indicates that the data corresponding to the first scheduling of the terminal device is transmitted on the first resource, and the first resource is a subset of the second resource, determine, by the terminal device, the second processing manner as the target processing manner.

Optionally, in an embodiment, the processor 403 is configured to: when the second indication information indicates that the soft values of the first data are to be processed in the first processing manner, the first indication information indicates that the data corresponding to the first scheduling of the terminal device is transmitted on the first resource, and the first resource is not a subset of the second resource, determine, by the terminal device, the first processing manner as the target processing manner.

Optionally, in an embodiment, the processor 403 is configured to: when the second indication information indicates that the soft values of the first data are to be processed in the first processing manner, the first indication information indicates that the data corresponding to the first scheduling of the terminal device is transmitted on the first resource, and the first resource is not a subset of the second resource, determine, by the terminal device, a ratio of a size of the third resource to a size of the first resource; and when the ratio of the size of the third resource to the size of the first resource exceeds a preset threshold, determine, by the terminal device, the second processing manner as the target processing manner; or when the ratio of the size of the third resource to the size of the first resource is less than or equal to the preset threshold, determine, by the terminal device, the first processing manner as the target processing manner.

Optionally, in an embodiment, the processor 403 is configured to: when the second indication information indicates that the soft values of the first data are to be processed in the first processing manner, and the second resource is a subset of the first resource, determine, by the terminal device, the first processing manner as the target processing manner; or when the second indication information indicates that the soft values of the first data are to be processed in the second processing manner, and the second resource is a subset of the first resource, determine, by the terminal device, the second processing manner as the target processing manner.

Optionally, in an embodiment, the processor 403 is configured to: when the first indication information indicates that the data corresponding to the first scheduling of the terminal device is transmitted on the first resource, and the first resource is a subset of the second resource, determine, by the terminal device, the second processing manner as the target processing manner; or when the first indication information indicates that no data corresponding to the first scheduling of the terminal device is transmitted on the first resource, and the first resource is a subset of the second resource, determine, by the terminal device, the first processing manner as the target processing manner.

Optionally, in an embodiment, the processor 403 is configured to: determine, by the terminal device in a first case or a second case, a modulation scheme of the data carried on the third resource; and when the third resource carries the data whose modulation scheme is different from a modulation scheme indicated by the first scheduling, determine the first processing manner as the target processing manner. The first case includes: The first indication information indicates that the data corresponding to the first scheduling is transmitted on the first resource, and the second indication information indicates that the soft values of the first data are to be processed in the first processing manner. The second case includes: The first indication information indicates that no data corresponding to the first scheduling is transmitted on the first resource, and the second indication information indicates that the soft values of the first data are to be processed in the second processing manner.

Optionally, in an embodiment, when the first indication information indicates that the data corresponding to the first scheduling of the terminal is transmitted on the first resource, the first indication information indicates that the entire first resource is used to transmit data that is corresponding to L times of scheduling of L devices and that is on the first resource, where the L devices are in a one-to-one correspondence with the L times of scheduling, the L devices include the terminal device, the L times of scheduling include the first scheduling, and L is an integer greater than 0.

Optionally, in an embodiment, when the first indication information indicates that no data corresponding to the first scheduling of the terminal device is transmitted on the first resource, the first indication information indicates that a part or none of the first resource is used to transmit data that is corresponding to L times of scheduling of L devices and that is on the first resource, where the L devices are in a one-to-one correspondence with the L times of scheduling, the L devices include the terminal device, the L times of scheduling include the first scheduling, and L is an integer greater than 0.

Optionally, in an embodiment, when the second indication information indicates that the soft values of the first data are to be processed in the first processing manner, the second indication information indicates that all or some of the soft values of the first data are to be processed in the first processing manner.

Optionally, in an embodiment, the first processing manner and the second processing manner indicate erasing soft values of data, where an erasing strength the soft values of the data in the first processing manner is greater than an erasing strength the soft values of the data in the second processing manner.

Optionally, in an embodiment, the first processing manner and the second processing manner indicate retaining soft values of data, where a strength of retaining the soft values of the data in the first processing manner is less than a strength of retaining the soft values of the data in the second processing manner.

This application further provides a computer readable medium. The computer readable medium stores program code to be executed by a device, and the program code includes an instruction used to perform the data processing method in the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for indicating a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely example implementations of this application that are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data processing method, comprising:
   receiving, by a terminal device, first indication information sent by a network device, wherein the first indication information is used to indicate whether data corresponding to a first scheduling of the terminal device is transmitted on a first resource, an intersection is set between the first resource and a resource corresponding to the first scheduling;
   receiving, by the terminal device, second indication information sent by the network device, wherein the second indication information is used to indicate that soft values of first data received by the terminal device are to be processed in a first processing manner or a second processing manner, the first processing manner and the second processing manner are different processing manners, the first data is carried on a second resource, and both the first resource and the second resource comprise a third resource;
   determining, by the terminal device, a target processing manner from the first processing manner and the second processing manner based on the first indication information and/or the second indication information; and
   processing, by the terminal device, soft values of data in the third resource in the target processing manner.

2. The method according to claim 1, wherein the determining, by the terminal device, the target processing manner from the first processing manner and the second processing manner based on the first indication information and/or the second indication information comprises:
   determining, by the terminal device, the second processing manner as the target processing manner based on a determination that the second indication information indicates the soft values of the first data are to be processed in the second processing manner.

3. The method according to claim 2, wherein the determining, by the terminal device, the target processing manner from the first processing manner and the second processing manner based on the first indication information and/or the second indication information comprises:
   determining, by the terminal device, the second processing manner as the target processing manner based on a determination the second indication information indicates the soft values of the first data are to be processed in the first processing manner, and the first indication information indicates the data corresponding to the first scheduling is transmitted on the first resource.

4. The method according to claim 2, wherein the determining, by the terminal device, the target processing manner from the first processing manner and the second processing manner based on the first indication information and/or the second indication information comprises:
   determining, by the terminal device, the second processing manner as the target processing manner based on a determination that the second indication information indicates the soft values of the first data are to be processed in the first processing manner, the first indication information indicates the data corresponding to the first scheduling of the terminal device is transmitted on the first resource, and the first resource is a subset of the second resource.

5. The method according to claim 2, wherein the determining, by the terminal device, the target processing manner from the first processing manner and the second processing manner based on the first indication information and/or the second indication information comprises:
   determining, by the terminal device, the first processing manner as the target processing manner based on a determination that the second indication information indicates the soft values of the first data are to be processed in the first processing manner, the first indication information indicates the data corresponding to the first scheduling of the terminal device is transmitted on the first resource, and the first resource is not a subset of the second resource.

6. The method according to claim 2, wherein the determining, by the terminal device, the target processing manner from the first processing manner and the second processing manner based on the first indication information and/or the second indication information comprises:
   determining, by the terminal device, a ratio of a size of the third resource to a size of the first resource based on a determination that the second indication information indicates the soft values of the first data are to be processed in the first processing manner, the first indication information indicates the data corresponding to the first scheduling of the terminal device is transmitted on the first resource, and the first resource is not a subset of the second resource; and
   determining, by the terminal device, the second processing manner as the target processing manner based on a determination that the ratio of the size of the third resource to the size of the first resource exceeds a preset threshold; or
   determining, by the terminal device, the first processing manner as the target processing manner based on a determination that the ratio of the size of the third resource to the size of the first resource is less than or equal to a preset threshold.

7. The method according to claim 1, wherein the determining, by the terminal device, the target processing manner from the first processing manner and the second processing manner based on the first indication information and/or the second indication information comprises:
   determining, by the terminal device, the first processing manner as the target processing manner based on a determination that the second indication information indicates the soft values of the first data are to be processed in the first processing manner, and the second resource is a subset of the first resource; or
   determining, by the terminal device, the second processing manner as the target processing manner based on a determination that the second indication information indicates the soft values of the first data are to be processed in the second processing manner, and the second resource is a subset of the first resource.

8. The method according to claim 1, wherein the determining, by the terminal device, the target processing manner from the first processing manner and the second processing manner based on the first indication information and/or the second indication information comprises:

determining, by the terminal device, the second processing manner as the target processing manner based on a determination that the first indication information indicates the data corresponding to the first scheduling of the terminal device is transmitted on the first resource, and the first resource is a subset of the second resource; or determining, by the terminal device, the first processing manner as the target processing manner based on a determination that the first indication information indicates no data corresponding to the first scheduling of the terminal device is transmitted on the first resource, and the first resource is a subset of the second resource.

9. The method according to claim 1, wherein the determining, by the terminal device, the target processing manner from the first processing manner and the second processing manner based on the first indication information and/or the second indication information comprises:

determining, by the terminal device in a first case or a second case, a modulation scheme of the data carried on the third resource; and determining the first processing manner as the target processing manner based on a determination that the third resource carries the data whose modulation scheme is different from a modulation scheme indicated by the first scheduling; wherein the first case comprises: the first indication information indicates the data corresponding to the first scheduling is transmitted on the first resource, and the second indication information indicates the soft values of the first data are to be processed in the first processing manner; and the second case comprises: the first indication information indicates no data corresponding to the first scheduling is transmitted on the first resource, and the second indication information indicates the soft values of the first data are to be processed in the second processing manner.

10. The method according to claim 1, wherein when the first indication information indicates the data corresponding to the first scheduling of the terminal device is transmitted on the first resource, the first indication information indicates the entire first resource is used to transmit data that is corresponding to L times of scheduling of L devices and that is on the first resource, where the L devices are in a one-to-one correspondence with the L times of scheduling, the L devices comprise the terminal device, the L times of scheduling comprise the first scheduling, and L is an integer greater than 0.

11. A terminal device, comprising:
a transceiver, configured to:
receive first indication information sent by a network device, wherein the first indication information is used to indicate whether data corresponding to a first scheduling of the terminal device is transmitted on a first resource, and an intersection is set between the first resource and a resource corresponding to the first scheduling; and receive second indication information sent by the network device, wherein the second indication information is used to indicate that soft values of first data received by the terminal device are to be processed in a first processing manner or a second processing manner, the first processing manner and the second processing manner are different processing manners, the first data is carried on a second resource, and both the first resource and the second resource comprise a third resource; and a processor, configured to execute a program stored in a memory to:
determine a target processing manner from the first processing manner and the second processing manner based on the first indication information and/or the second indication information; and process soft values of data in the third resource in the target processing manner.

12. The terminal device according to claim 11, wherein the processor is further configured to:
determine the second processing manner as the target processing manner based on a determination that the second indication information indicates the soft values of the first data are to be processed in the second processing manner.

13. The terminal device according to claim 12, wherein the processor is further configured to:
determine the second processing manner as the target processing manner based on a determination that the second indication information indicates the soft values of the first data are to be processed in the first processing manner, and the first indication information indicates the data corresponding to the first scheduling is transmitted on the first resource.

14. The terminal device according to claim 12, wherein the processor is further configured to:
determine the second processing manner as the target processing manner based on a determination that the second indication information indicates the soft values of the first data are to be processed in the first processing manner, the first indication information indicates the data corresponding to the first scheduling of the terminal device is transmitted on the first resource, and the first resource is a subset of the second resource.

15. The terminal device according to claim 12, wherein the processor is further configured to:
determine the first processing manner as the target processing manner based on a determination that the second indication information indicates the soft values of the first data are to be processed in the first processing manner, the first indication information indicates the data corresponding to the first scheduling of the terminal device is transmitted on the first resource, and the first resource is not a subset of the second resource.

16. The terminal device according to claim 12, wherein the processor is further configured to:
determine a ratio of a size of the third resource to a size of the first resource based on a determination that the second indication information indicates the soft values of the first data are to be processed in the first processing manner, the first indication information indicates the data corresponding to the first scheduling of the terminal device is transmitted on the first resource, and the first resource is not a subset of the second resource; and determine the second processing manner as the target processing manner based on a determination that the ratio of the size of the third resource to the size of the first resource exceeds a preset threshold; or determine the first processing manner as the target processing manner based on a determination that the ratio of the size of the third resource to the size of the first resource is less than or equal to a preset threshold.

17. The terminal device according to claim 11, wherein the processor is further configured to:
  determine the first processing manner as the target processing manner based on a determination that the second indication information indicates the soft values of the first data are to be processed in the first processing manner, and the second resource is a subset of the first resource; or
  determine the second processing manner as the target processing manner based on a determination that the second indication information indicates the soft values of the first data are to be processed in the second processing manner, and the second resource is a subset of the first resource.

18. The terminal device according to claim 11, wherein the processor is further configured to:
  determine the second processing manner as the target processing manner based on a determination that the first indication information indicates the data corresponding to the first scheduling of the terminal device is transmitted on the first resource, and the first resource is a subset of the second resource; or
  determine the first processing manner as the target processing manner based on a determination that the first indication information indicates no data corresponding to the first scheduling of the terminal device is transmitted on the first resource, and the first resource is a subset of the second resource.

19. The terminal device according to claim 11, wherein the processor is further configured to:
  determine in a first case or a second case, a modulation scheme of the data carried on the third resource; and
  determine the first processing manner as the target processing manner based on a determination that the third resource carries the data whose modulation scheme is different from a modulation scheme indicated by the first scheduling,
wherein
  the first case comprises: the first indication information indicates the data corresponding to the first scheduling is transmitted on the first resource, and the second indication information indicates the soft values of the first data are to be processed in the first processing manner; and
  the second case comprises: the first indication information indicates no data corresponding to the first scheduling is transmitted on the first resource, and the second indication information indicates the soft values of the first data are to be processed in the second processing manner.

20. The terminal device according to claim 11, wherein when the first indication information indicates the data corresponding to the first scheduling of the terminal is transmitted on the first resource, the first indication information indicates the entire first resource is used to transmit data that is corresponding to L times of scheduling of L devices and that is on the first resource, where the L devices are in a one-to-one correspondence with the L times of scheduling, the L devices comprise the terminal device, the L times of scheduling comprise the first scheduling, and L is an integer greater than 0.

* * * * *